United States Patent
Hossain et al.

(10) Patent No.: US 6,740,453 B2
(45) Date of Patent: May 25, 2004

(54) ELECTROCHEMICAL CELL WITH CARBONACEOUS MATERIAL AND MOLYBDENUM CARBIDE AS ANODE

(75) Inventors: Sohrab Hossain, Tucson, AZ (US); Mohamed H. Khan, Tucson, AZ (US)

(73) Assignee: Cyprus Amax Minerals Company, Phoenix, AZ (US)

( * ) Notice: Subject to any disclaimer, the term of this patent is extended or adjusted under 35 U.S.C. 154(b) by 96 days.

(21) Appl. No.: 10/084,529

(22) Filed: Feb. 27, 2002

(65) Prior Publication Data

US 2003/0162093 A1 Aug. 28, 2003

(51) Int. Cl.$^7$ ............................................. H01M 4/58
(52) U.S. Cl. ................. 429/231.5; 429/231.1; 429/232
(58) Field of Search .......................... 429/218.1, 231.1, 429/231.4, 231.5, 232

(56) References Cited

U.S. PATENT DOCUMENTS

| | | | |
|---|---|---|---|
| 5,385,794 A | * 1/1995 | Yokoyama et al. | ......... 429/334 |
| 5,686,203 A | 11/1997 | Idota et al. | |
| 5,834,138 A | 11/1998 | Yamada et al. | |
| 5,939,224 A | * 8/1999 | Bito et al. | ................... 429/220 |
| 6,355,377 B1 | * 3/2002 | Sheem et al. | ............ 429/231.8 |
| 6,479,426 B2 | * 11/2002 | Ryu et al. | ................... 502/182 |
| 2002/0012845 A1 | 1/2002 | Choi et al. | |
| 2003/0102099 A1 | 6/2003 | Yadav et al. | |

FOREIGN PATENT DOCUMENTS

| | | |
|---|---|---|
| CA | 2098248 A1 | 12/1994 |
| EP | 0 486 950 B1 | 10/1994 |
| JP | 03-245458 B2 | 1/1991 |
| JP | 10 112316 A2 * | 4/1998 ............ H01M/4/58 |
| JP | 3986 10/112316 | 4/1998 |

OTHER PUBLICATIONS

PCT International Search Report, PCT/US03/06080, International filing date Feb. 26, 2003, Priority date Feb. 27, 2002, 3 pages.
Sato et al., "A Mechanism of Lithium Storage in Disordered Carbons," Science, vol. 264, pp. 556–558, Apr. 22, 1994.
Mabuchi et al., "Charge–Discharge Characteristics of the Mesocarbon Microbeads Heat–Treated at Different Temperatures," Seventh International Meeting on Lithium Batteries, Extended Abstract, pp. 212–216, 1994.
Braithwaite et al., "Molybdenum: An Outline of its Chemistry and Uses," pp. 73–75, 1994, Elsevier Science B.V., Amsterdam, The Netherlands.

* cited by examiner

*Primary Examiner*—Carol Chaney
(74) *Attorney, Agent, or Firm*—Bruce E. Dahl; Dahl & Osterloth, LLP (57) ABSTRACT

A rechargeable lithium ion electrochemical cell and/or battery configured to provide improved reversible energy storage capacity is disclosed. The electrochemical cell and/or battery comprising a body of aprotic, non-aqueous electrolyte, first and second electrodes in effective electrochemical contact with the electrolyte, the first electrode comprising a cathode formed by active materials such as a lithiated intercalation compound and the second electrode comprising an anode formed by a carbonaceous material combined with molybdenum carbide. An electrochemical lithium ion cell and/or battery according to the invention is designed to provide improved reversible energy storage capacity characteristics as compared with similar lithium-ion cells having carbon anodes that are not combined with molybdenum carbide.

17 Claims, 7 Drawing Sheets

Discharge Charge profile of a commercial graphite mixed with 8% $Mo_2C$ in 1M $LiPF_6$ Electrolyte.
Counter Electrode: Li.

Fig. 1: Discharge Charge profile of a commercial graphite mixed with 8% $Mo_2C$ in 1M $LiPF_6$ Electrolyte. Counter Electrode: Li.

Fig. 2: Lithium-ion intercalation capacity of a commercial graphite mixed with 8% $Mo_2C$ in 1M $LiPF_6$ Electrolyte.

Fig.3: Discharge Charge Profile of a Commercial Graphite Anode made in accordance to the Prior Art.

Fig. 4: Lithium-ion Intercalation Capacity of a Commercial Graphite Anode made in Accordance to the Prior Art.

Fig. 5: Cycling Behavior with respect to Anode Capacity of a Lithium-ion Cell made in Accordance with the Present Invention.

Fig. 6: Cycling Behavior with respect to Anode Capacity of a Lithium-ion Cell in Accordance with the Prior Art.

Figure 7: Schematic Diagram of a Lithium Ion-Cell.

ELECTROCHEMICAL CELL WITH CARBONACEOUS MATERIAL AND MOLYBDENUM CARBIDE AS ANODE

FIELD OF THE INVENTION

The present invention relates to non-aqueous secondary lithium-ion electrochemical cells and batteries.

BACKGROUND

Lithium-ion batteries are considered to be the rechargeable batteries of the future for portable electronics to aerospace to vehicular applications. In a known construction for a lithium-ion battery, carbon or graphite is used as an anode, a lithiated transition metal intercalation compound is used as a cathode and $LiPF_6$ is used as an electrolyte in carbonate-based nonaqueous solvents.

The electrochemical process is the uptake of lithium ions at the anode during charge and their release during discharge, rather than lithium plating and stripping as occurs in metallic lithium rechargeable battery systems. As metallic lithium is not present in the cell, lithium-ion cells have enhanced safety and a longer cycle life than the cells containing metallic lithium.

At present, disordered carbon (hard carbon) and ordered carbon (graphite) are used as anodes in commercial lithium-ion batteries. The carbonaceous materials can deliver a reversible specific capacity of 372 mAh/g, corresponding to the chemical formula $LiC_6$ as compared to 3830 mAh/g for metallic lithium. The practical reversible capacity of these carbonaceous materials is even lower in the range of 300–340 mAh/g.

Other carbonaceous materials, also of disordered structure and are known as "soft carbon", of high reversible capacity have been prepared by pyrolysis of suitable starting materials. Sato et al (Science, 264, 556, 1994) disclosed a carbonaceous material prepared by heating polyparaphenylene at 700° C. which has a reversible capacity of 680 mAh/g. Mabuchi et al (Seventh International Meeting on Lithium Batteries, Extended Abstracts, Page 212, Boston, Mass., 1994) disclosed a low density carbonaceous material prepared by heating coal tar pitch at 700° C. which has a reversible capacity of about 750 mAh/g. Yamada et al (U.S. Pat. No. 5,834,138, Nov. 10, 1998) disclosed a carbonaceous material prepared by heat treatment of coffee beans, tea leaves, corns, etc. at 1100–1200° C. The carbonaceous material delivers a reversible capacity of 500 mAh/g.

These values of reversible capacities are much greater than that of the carbonaceous materials used in commercial lithium-ion cells. However, low density and very high irreversible capacity loss of the above carbonaceous materials limit their commercial use as anodes for lithium-ion batteries.

It has been suggested that the reversible capacity of anodes formed of carbonaceous materials can be increased by the addition of other elements to the carbonaceous materials. For example, the addition of small amounts of phosphorous (European Patent Application No. EP 486950) and boron (Japanese Application Laid-Open No. 03-245458) are alleged to enhance the specific capacity of a carbonaceous anode. Moreover, Canadian Application Serial No. 2,098,248 discloses that substituting electron acceptors (such as boron, aluminum, etc.) for carbon atoms in the structure of the carbonaceous materials will enhance anode capacity.

SUMMARY OF THE INVENTION

The present invention provides a new and different concept for enhancing the reversible capacity of the carbonaceous material forming the active material of an anode in a lithium ion cell or battery. Specifically, the present invention provides a lithium-ion cell in which molybdenum carbide is combined with the carbonaceous material of the anode to enhance the reversible capacity of the carbonaceous material. This concept is also believed to promote the development of high specific energy and energy density lithium-ion cells and batteries.

Accordingly, it is the principal objective of the present invention to improve the reversible capacity of carbonaceous material forming the active material of an anode of a lithium-ion cell or battery.

Another objective of the present invention is to provide a novel and improved rechargeable lithium-ion cell and/or battery having high specific energy and energy density.

Further features of the present invention will become apparent from the following detailed description and the accompanying drawings.

DETAILED DESCRIPTION

According to the present invention, a lithium-ion cell or battery comprises a negative electrode (anode) formed of carbonaceous materials combined with molybdenum carbide, and a positive electrode (cathode) containing $LiCoO_2$, $LiNiCoO_2$, $LiNiCoAlO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$ or combinations of these materials. The substrates for the negative and positive electrodes are preferably copper and aluminum foils, respectively.

The electrolyte used in a lithium-ion cell and/or battery of the present invention is a non-aqueous aprotic organic electrolyte and preferably a non-aqueous solution consisting of a solute, such as $LiPF_6$, $LiBF_4$, $LiAsF_6$, $LiCF_3SO_3$, $LiN(CF_3SO_2)_2$ or $LiClO_4$, dissolved in a solvent such as propylene carbonate, ethylene carbonate, diethyl carbonate, ethyl methyl carbonate, and dimethyl carbonate as well as combinations of such materials.

The high reversible capacity of the lithium-ion cell or battery embodying an anode made of carbonaceous material combined with molybdenum carbide, in accordance with the present invention, provides ease of cell balance with high capacity cathode and results in a high capacity and high energy density lithium-ion cell. The present invention, however, is not limited to that theory. Suffice it to say, as shall become more apparent in the following Examples, it has been surprisingly discovered that a significant improvement in performance, beyond what might normally be expected, is possible with the lithium-ion cell and/or battery of the present invention.

There are a number of known approaches suitable for producing molybdenum carbide as described in the review article; E. R. Braithwaite and J. Haber, "Molybdenum: An Outline of its Chemistry and Uses" Studies in Inorganic Chemistry 19, Elsevier, 1994. The present invention is not limited to any specific approach to produce molybdenum carbide.

Figure 7:
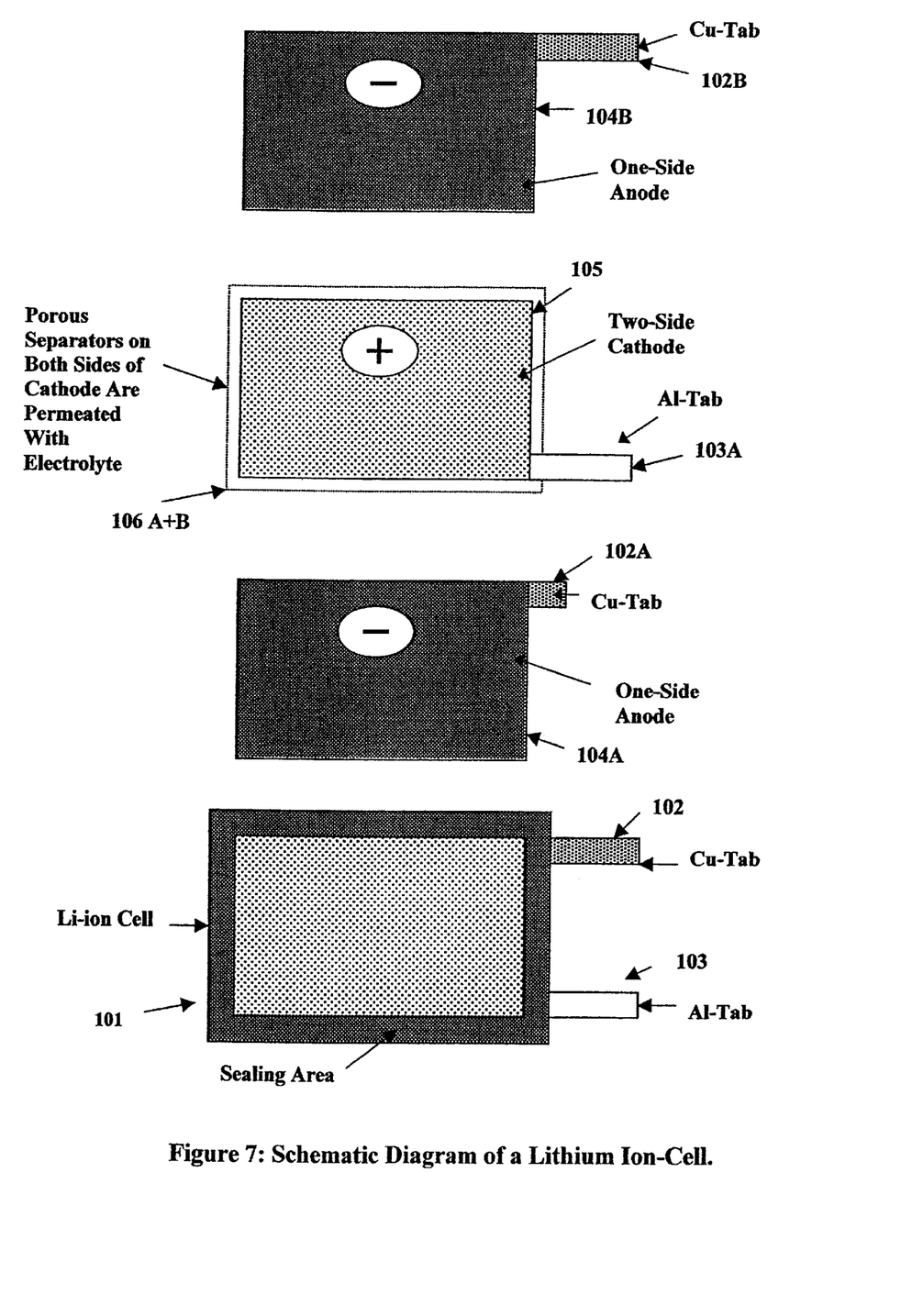
FIG. 7 is a schematic representation of a lithium-ion cell (both in assembled and exploded stages) embodying an anode in accordance with the present invention.

A preferred form of lithium-ion cell embodying a carbonaceous anode combined with molybdenum carbide is shown at 101 in FIG. 7. The assembled cell 101 is shown with the anode, cathode, and electrolyte not shown but enclosed in a sealed sandwich structure with the anode electrically accessible by means of protruding conductive copper tab 102 and the lithiated intercalation compound cathode electrically accessible by means of a protruding conductive aluminum tab 103. The anode and cathode of the assembled cell 101 are separated by a porous separator that is permeated with an aprotic non-aqueous electrolyte that is in effective contact with both the anode and cathode.

More specifically, as shown in the exploded component portion of FIG. 7, a pair of one-sided anodes 104A and 104B and a two-sided cathode 105, are configured to be assembled as a sandwich (cell 101) with the two-sided cathode 105 positioned between and separated from the respective anodes 104A and 104B by respective porous separators 106A and 106B that are permeated with an aprotic, non-aqueous electrolyte that is in effective contact with both the cathode and the facing anodes. Conductive copper tabs 102A and 102B are provided for the respective anodes 104A and 104B and an aluminum tab 103A is provided for the two-sided cathode 105, whereby the respective electrodes of the cell 101 are electrically accessible when assembled as a sandwich and enclosed within a sealed enclosure (not shown).

In the cell 101, the anodes 104A, 104B each comprises carbonaceous material (e.g of an ordered carbon such as graphite, or of a disordered carbon such as 'soft carbon' combined with molybdenum carbide and supported by a copper foil substrate. The cathode 105 may be formed of $LiCoO_2$, $LiNiCoO_2$, $LiNiCoAlO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$ or a combination of such materials, supported by an aluminum foil substrate. The respective anode and cathode electrodes are maintained spaced from one another by a respective electrically non-conductive separator that is permeable whereby the aprotic, non-aqueous electrolyte is carried by the separators 106A, 106B, and maintained in effective electrochemical contact with both the cathode and facing anode. The permeable separators may each be formed of a micro-porous poly-olefin film.

Although the respective anodes and cathodes of the cell 101 are shown as flat plates, it is to be understood that other configuration can be used, such as spiral or so-called jelly-roll configuration, wherein the respective anode and cathode electrodes are nevertheless maintained physically and electrically spaced from one another by a permeable spacer that carries the electrolyte and maintains it in effective electrochemical contact with the respective anode and cathode surfaces.

Moreover, there are different ways to form the anode of carbonaceous material and to combine the carbonaceous material with molybdenum carbide. For example, one way of combining the carbonaceous material with molybdenum carbide is to thoroughly mix molybdenum carbide with the carbonaceous material. Another way is to add molybdenum compound to carbonaceous material and heat-treat to convert the added molybdenum compound to molybdenum carbide. The present invention is directed to an anode for a lithium ion cell, in which carbonaceous material is combined with molybdenum carbide, but is not intended to be limited to any particular way of combining the carbonaceous material with the molybdenum carbide.

Also, it should be noted that it is preferred that a relatively small amount (by weight) of the molybdenum carbide is combined with the carbonaceous material. More specifically, it is preferred that the molybdenum carbide be less than 20% (by weight) and even more preferably in the range of 0.1% to 15% (by weight). In addition, it is preferred that the particle size of molybdenum carbide in the second electrode is in the range of 0.05 $\mu$m to 3 $\mu$m.

It is to be understood that a plurality of electrochemical cells as described above can be used to assemble a battery of such cells by connecting the respective electrodes of the assembly of cells in an electrical circuit defining a battery (in a known manner) to produce a battery with the voltage or current characteristics as determined by the number of cells connected in series or parallel circuit relationship.

Figure 5:
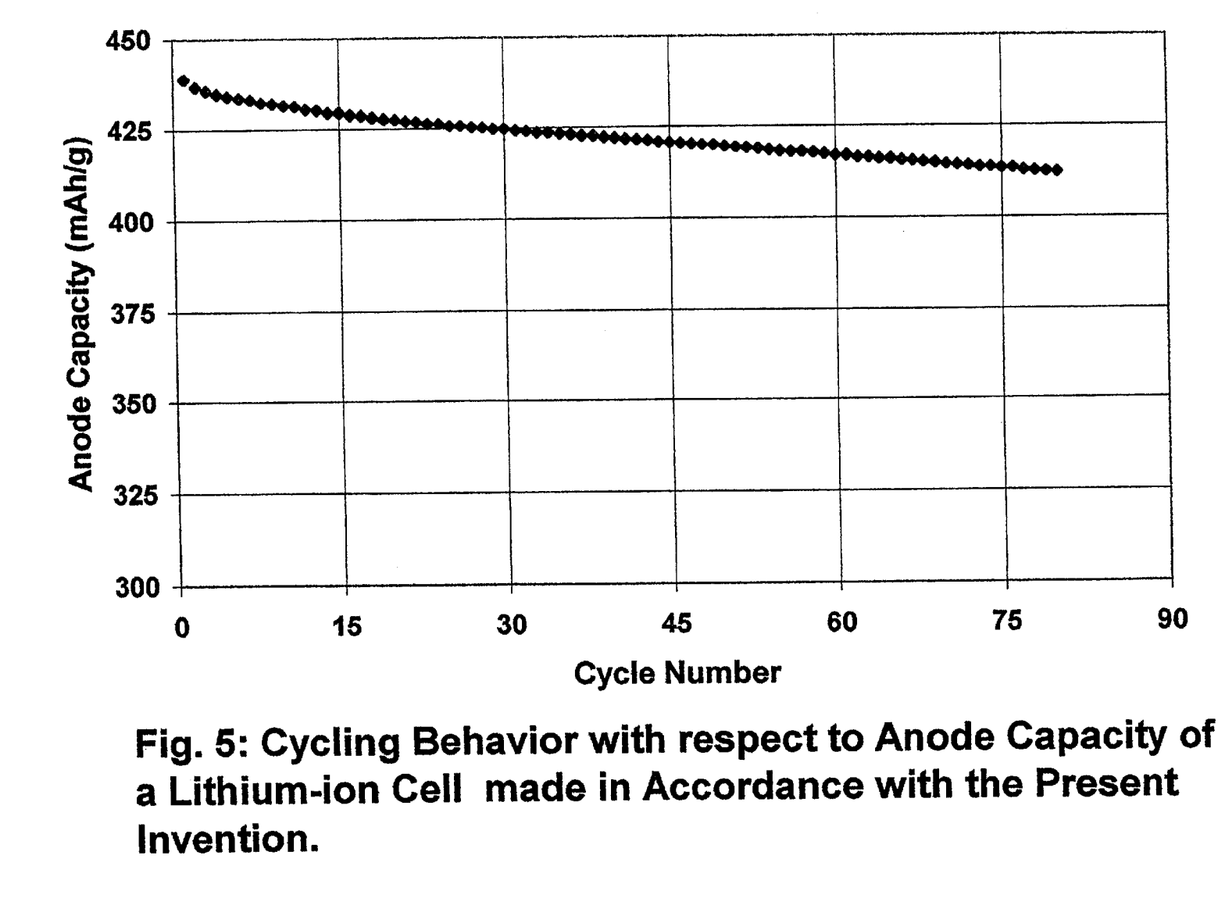
FIG. 5 shows the cycling behavior of a lithium-ion cell made with molybdenum carbide added to carbonaceous anode material, in accordance with the present invention.

The following specific examples are given to illustrate the practice of the invention, but are not to be considered as limiting in any way. Examples 1 and 2 demonstrate the proof of principle of the present invention, and Examples 3, cells B1 and B2, and the first cell described in Example 4 (whose performance is illustrated in FIG. 5) relate to lithium ion cells made according to the principles of the present invention.

EXAMPLE 1

0.465 g of molybdenum carbide (of particle size of about 1 $\mu$m) obtained from Climax Molybdenum Company, Tucson, Ariz. was thoroughly mixed with 5.00 g of S26813 graphite obtained from Superior Graphite Co, Chicago, Ill. The mixture was then used as the active material of the working electrode of a half-cell to evaluate the concept of the present invention. The half-cell included a working electrode made from the mixture of the graphite and molybdenum carbide, a metallic lithium counter electrode and 1M $LiPF_6$ electrolyte in a mixture (2:1 w/w) of ethylene carbonate/dimethyl carbonate (EC/DMC) solvents. A microporous poly-olefin (Celgard 2400) separator was used in between the working and counter electrodes to isolate them electronically. A slurry of the graphite-molybdenum carbide mixture and 6% poly(vinyledene fluoride) was prepared in dimethyl formamide (DMF) and coated on to a copper foil to make the working electrode. The counter electrode was made of metallic lithium of 50 $\mu$m thick press fitted to the expanded nickel mesh substrate.

The aprotic, non-aqueous 1M $LiPF_6$ electrolyte mixture permeated the micro-porous poly-olefin separator, whereby the electrolyte was in effective contact with both the positive and negative electrodes, which were nevertheless maintained space and electrically isolated from one another.

Figure 1:
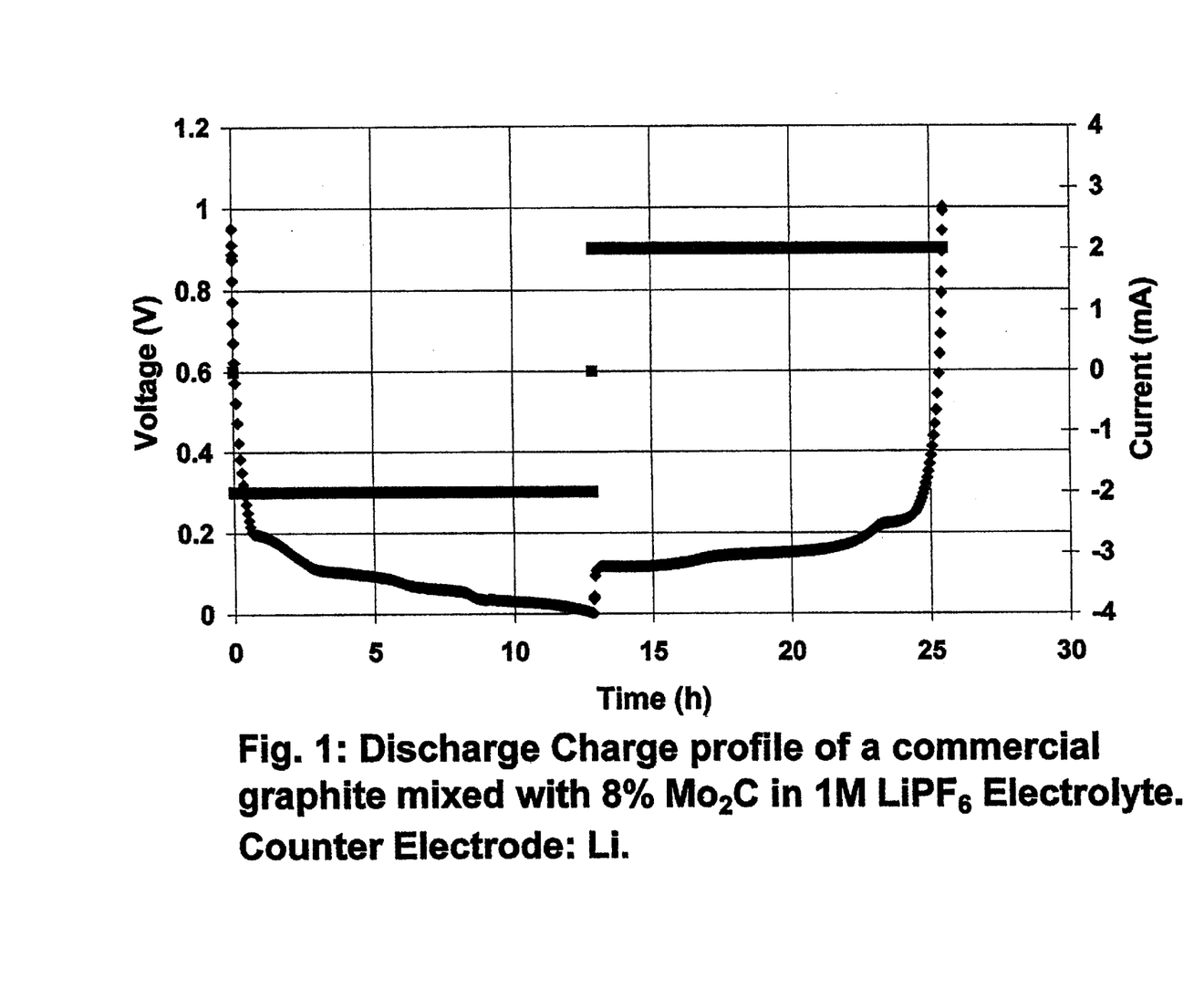
FIG. 1 is a graph representing the discharge charge characteristics of a carbonaceous material containing 8% molybdenum carbide additive in demonstrating the principle of the present invention.
Figure 2:
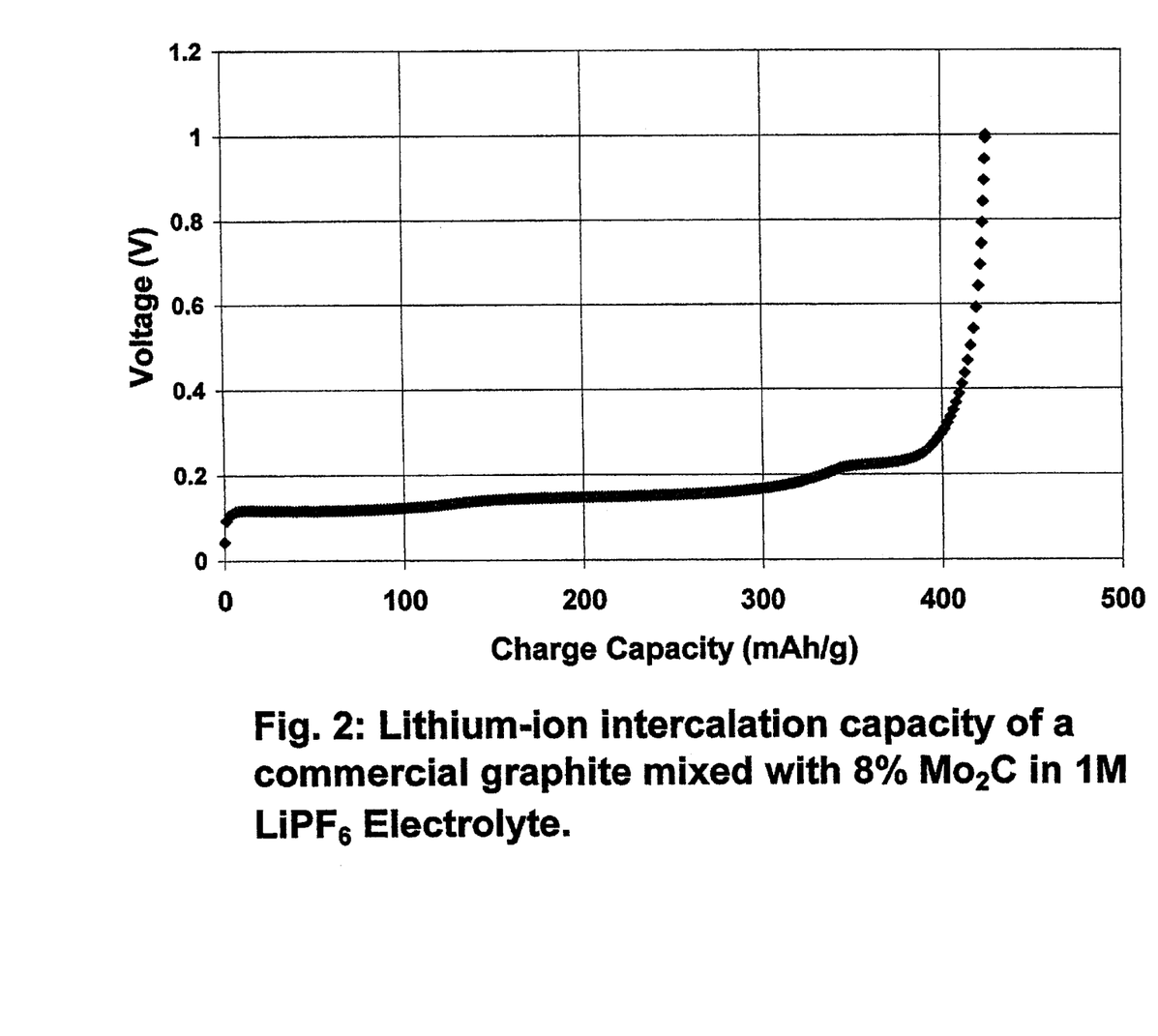
FIG. 2 is a graph representing the charge capacity of a carbonaceous material containing 8% molybdenum carbide additive in demonstrating the principles of the present invention.

The developed half-cell was discharged (intercalation of lithium-ions) at a constant current of 2 mA to 0.00 V and then charged (de-intercalation of lithium-ions) at the same current rate to a cut-off voltage of 1.0 V. The discharge charge process was repeated several times (usually 2–5) until a fairly constant capacity value of discharge charge was obtained. FIG. 1 shows the discharge charge characteristics of the developed half-cell containing the mixture of the graphite and molybdenum carbide according to the present invention. The charge capacity (de-intercalation of lithium ions) of the cell was 425 mAh/g as shown in FIG. 2, which is considered to be the reversible capacity of the working electrode (i.e. the electrode containing carbonaceous material and molybdenum carbide).

Figure 3:
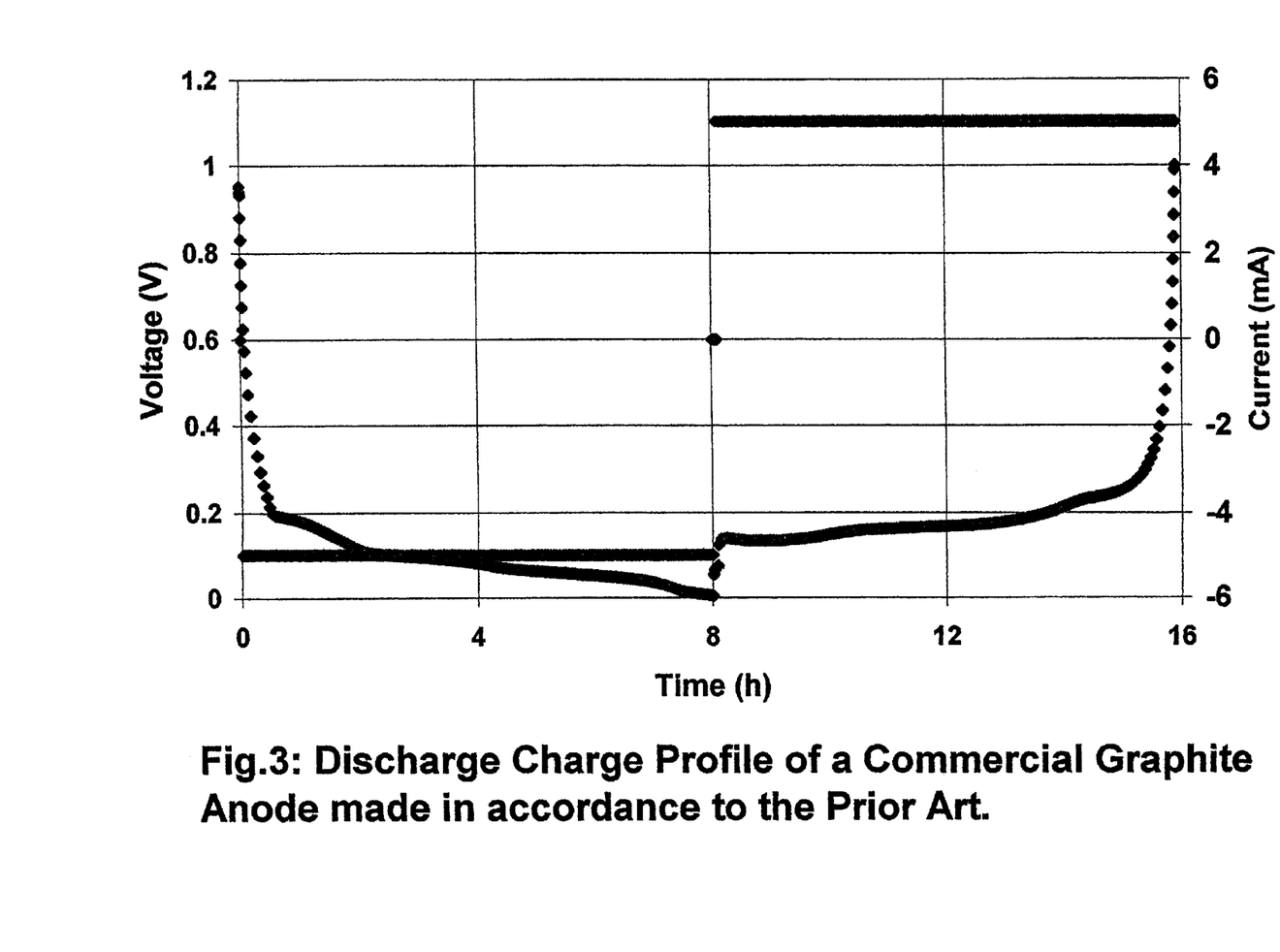
FIG. 3 is a graph representing the discharge charge characteristics of a carbonaceous material without molybdenum carbide.
Figure 4:
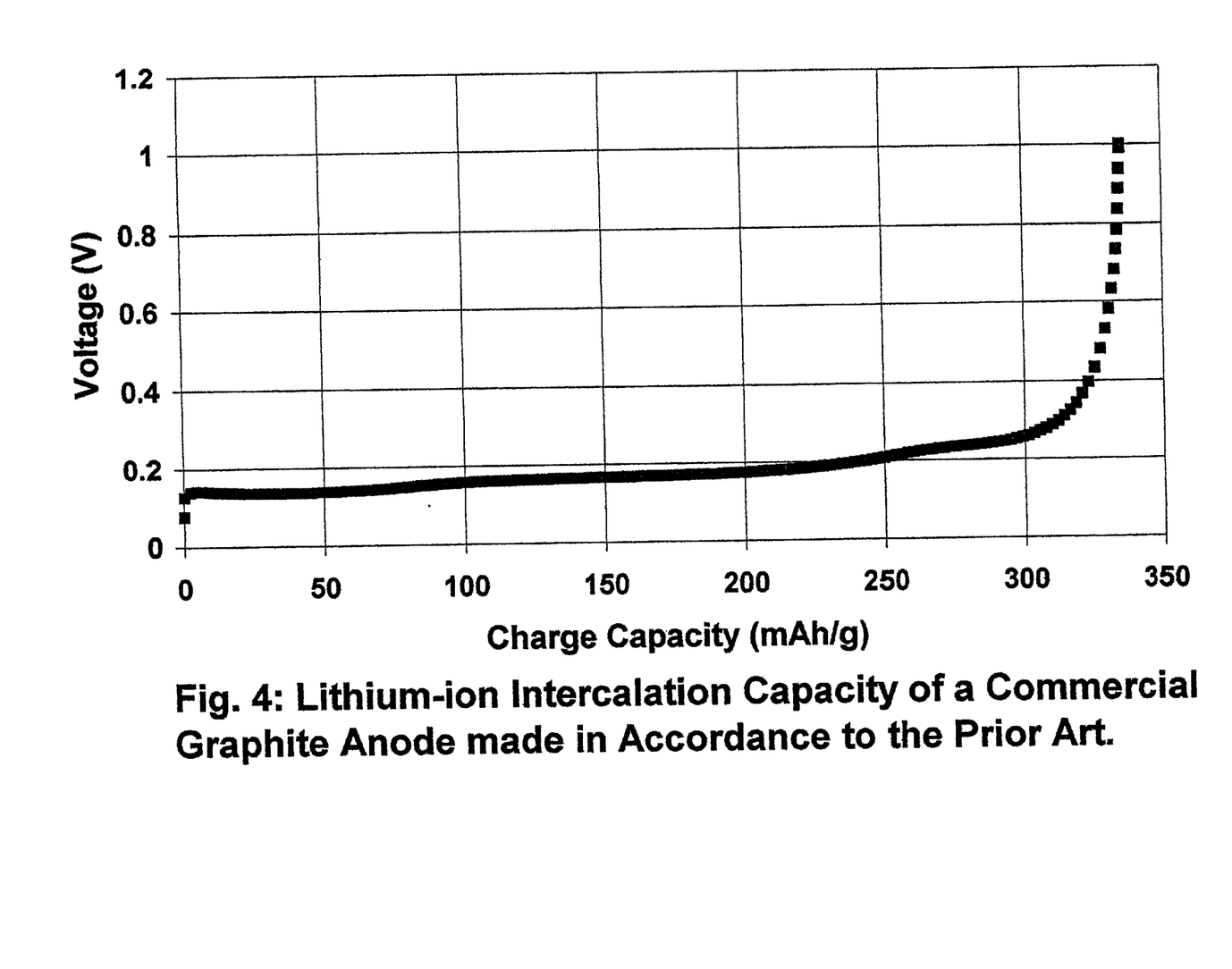
FIG. 4 is a graph representing the charge capacity of a carbonaceous material without molybdenum carbide.

A half-cell was made with the same components as described above except the active material of the working electrode was S26813 graphite (Superior Graphite Co) without molybdenum carbide. The half-cell was discharged and charged under the same conditions as the previous half-cell. FIG. 3 shows the discharge charge behavior of this half-cell containing the electrode material. The charge capacity of the cell was 330 mAh/g as shown in FIG. 4, which is almost 30% lower than that obtained in accordance with the present invention.

EXAMPLE 2

Several half-cells were made as in Example 1 with as received BG39 graphite (Superior Graphite Co) and varying amounts of molybdenum carbide (Climax Molybdenum Co.) mixed with BG39 graphite as working electrodes and metallic lithium counter electrodes and an electrolyte comprising 1M $LiPF_6$ in a mixture of ethylene carbonate and diethyl carbonate (2:1 w/w). The half-cells were first discharged at a constant current to 0.00 V and then charged at the same current rate to a cut-off voltage of 1.0 V. The discharge charge process was repeated several times (usually 2–5) until a fairly constant capacity value of discharge charge was obtained. The charge capacities of these half-cells are shown in Table 1. The results indicate that the addition of molybdenum carbide increases the charge capacity of BG39 graphite. Thus, addition of only 5% molybdenum carbide to BG39 graphite increases its charge capacity from 334 mAh/g to 464 mAh/g.

TABLE 1

Effect of the Addition of Molybdenum Carbide on Charge Capacity of BG39 Graphite

| Amount of $Mo_2C$ (%) | Charge Capacity (mAh/g) | Increase in Capacity (%) |
|---|---|---|
| 0.0 | 334 | 0 |
| 5.0 | 464 | 39 |
| 8.0 | 460 | 38 |
| 15.0 | 391 | 17 |

EXAMPLE 3

Two lithium-ion cells designated A1 and A2 were made according to known prior techniques with $LiCoO_2$ as cathode material and F399 graphite supplied by Alumina Trading Company, New Jersey (No molybdenum carbide added) as anode material in 1M $LiPF_6$ electrolyte in a mixture of EC/DMC solvents (1:1 v/v). Two similar type of lithium-ion cells designated B1 and B2 were also built but the F399 graphite anodes of these cells contained 8% of molybdenum carbide of about 1 $\mu$m (Climax Molybdenum Co) additive. The four lithium-ion cells were charged first at 0.5 mA/cm² to 4.2 V and then at constant voltage (4.2 V) for 3 hours or until the residual current dropped to 0.025 mA/cm². The cells were then discharged at 0.5 mA/cm to a cut-off voltage of 3.0 V. The cells were charged and discharged for several times until a fairly constant values of charge and discharge capacities were obtained. The observed electrochemical performance of the cells is shown in Table 2. Again, the results demonstrate capacity improvement due to molybdenum carbide additive to the graphite anodes of cells B1 and B2 as compared with cells A1 and A2 having no molybdenum carbide additive to graphite anodes.

TABLE 2

Effects of Molybdenum Carbide Additive to Graphite Anode on Capacity of Lithium-ion Cell

| Cell # | Molybdenum carbide Additive (%) | Cathode Weight (g) | Anode Weight (g) | Cell Capacity (mAh) | Specific Capacity of Anode (mAh/g) |
|---|---|---|---|---|---|
| A1 | 0 | 0.446 | 0.113 | 35 | 333 |
| A2 | 0 | 0.446 | 0.117 | 36 | 331 |
| B1 | 8 | 0.446 | 0.115 | 48 | 449 |
| B2 | 8 | 0.446 | 0.112 | 47 | 451 |

EXAMPLE 4

SFG44 graphite (Timcal Corporation, New Jersey) mixed with 5% molybdenum carbide (of about 2 $\mu$m particle size) was used as an anode of a lithium-ion cell to evaluate the concept of the present invention. The lithium-ion cell included a negative electrode made from the mixture of SFG44 graphite and 5% molybdenum carbide (about 2 $\mu$m), a lithiated nickel cobalt dioxide positive electrode and 1M $LiPF_6$ electrolyte in a mixture (1:1 v/v) of ethylene carbonate/dimethyl carbonate (EC/DMC) solvents. A microporous poly-olefin (Celgard 2400) separator was used in between the positive and negative electrodes to isolate them electronically. The positive electrode was made from a mixture of 85% $LiNi_{0.8}Co_{0.2}O_2$, 6% carbon black and 9% PVDF in DMF by coating on to an aluminum foil.

The aprotic, non-aqueous 1M $LiPF_6$ electrolyte mixture permeated the micro-porous poly-olefin separator, whereby the electrolyte was in effective contact with both the positive and negative electrodes, which were nevertheless maintained space and electrically isolated from one another.

The developed cell was charged at a constant current of 0.5 mA/cm² to 4.0 V and then at a constant voltage (4.1 V) for 3 hours or until the current dropped to 0.02 mA/cm². The cell was then discharged at a constant current of 0.5 mA/cm² to a cut-off voltage of 2.75 V. The charge discharge process was repeated in order to evaluate the cycle life. FIG. 5 shows the cycling characteristics of the developed cell according to the present invention. The cell delivered 80 cycles with 93% capacity retention. The initial anode capacity of the cell was 439 mAh/g and after 80 cycles the anode capacity was 412 mAh/g.

Figure 6:
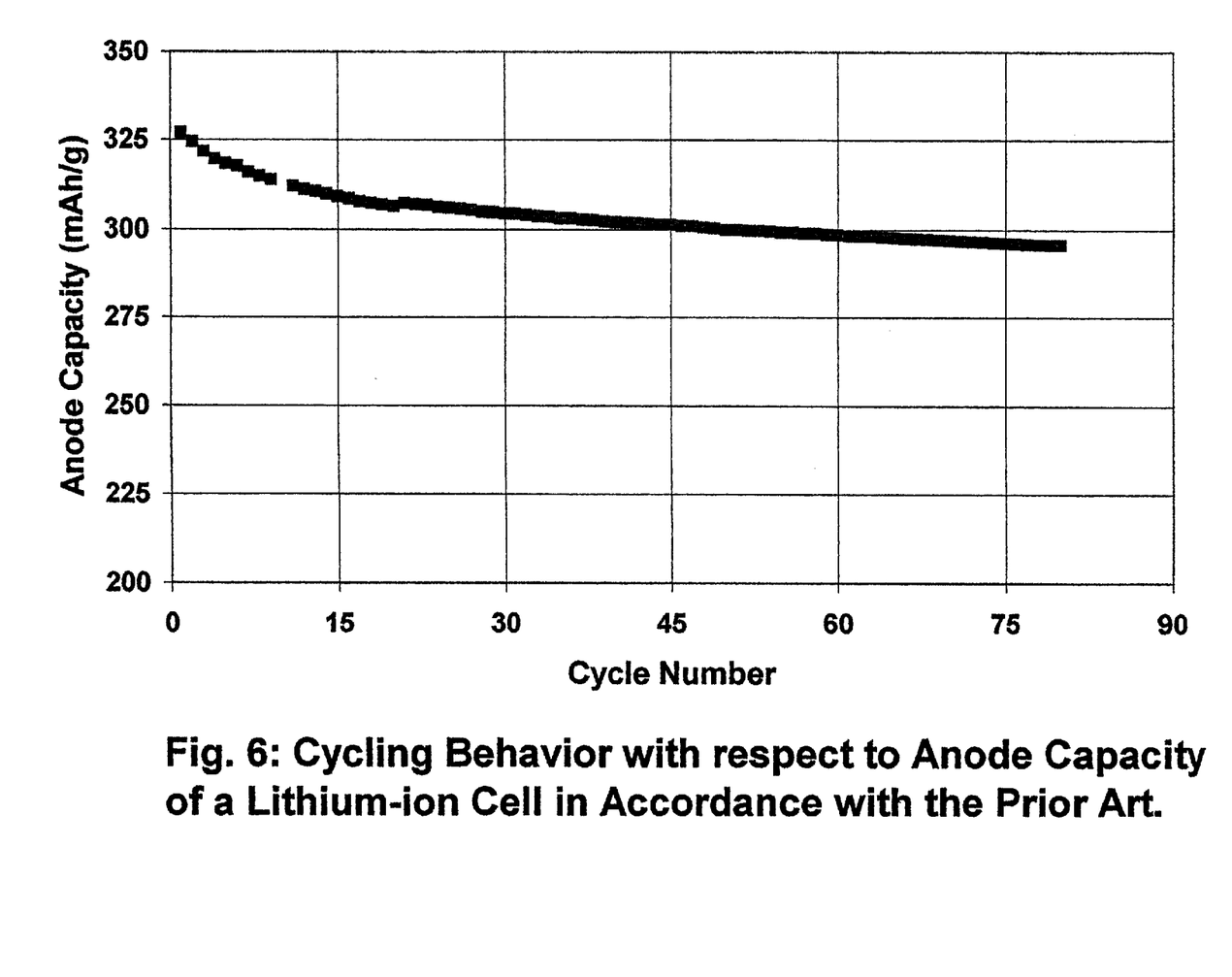
FIG. 6 shows the cycling behavior of a lithium-ion cell made in accordance with known prior techniques.

A lithium-ion cell was made with the same components as described above except the negative electrode was made from a mixture of 90% MCMB 2528 carbon and 10% PVDF in DMF (NO molybdenum carbide) by coating on to a copper foil. It is noteworthy to mention that MCMB 2528 carbon is used as an active material of anode for commercial lithium-ion cell. The cell was charged and discharged under the same conditions as the previous cell. FIG. 6 shows the cycling behavior of this cell. The cell lost 9% capacity after delivering only 80 cycles. The initial anode capacity of the cell was only 327 mAh/g and after 80 cycles, the anode capacity dropped to 296 mAh/g.

Thus, according to the foregoing description, applicant has provided a concept for enhancing the reversible capacity of the carbonaceous anode of a lithium ion cell and/or battery, by combining the carbonaceous material with molybdenum carbide. It is believed that with the foregoing description in mind, the manner in which various types of lithium ion cells and/or batteries, with enhanced reversible capacity of the carbonaceous material(s) of the anode(s) of the cells and/or batteries, will become apparent to those skilled in the art.

What is claimed is:

1. A rechargeable electrochemical cell comprising a body of aprotic, non-aqueous electrolyte, first and second electrodes in effective contact with said electrolyte, the first electrode comprising a lithiated intercalation compound, and the second electrode comprising carbonaceous material combined with molycarbide, wherein the amount of molybdenum carbide in the second electrode is less than about 20% by weight.

2. An electrochemical cell as defined in claim 1, wherein the amount of molybdenum carbide in the second electrode is in the range of 0.1% to 15% by weight.

3. An electrochemical cell as defined in claim 1, wherein the particle size of molybdenum carbide in the second electrode is in the range of about 0.05 $\mu$m to about 3 $\mu$m.

4. An electrochemical cell as defined in claim 1, wherein the lithiated transition metal intercalation compound of the first electrode is taken from a group comprising $LiCoO_2$, $LiNICoO_2$, $LiNiCoAlO_2$, $LiNiO_2$, $LiMn_2O_4$, $LiMnO_2$, $LiVO_5$, $LiVO_6O_{13}$, $LiTiS_2$, $Li_3FeN_2$, $Li_7VN_4$, and combinations of the foregoing.

5. An electrochemical cell as defined in claim 1, wherein the electrolyte comprises a lithium compound solute dissolved in a non-aqueous solvent.

6. An electrochemical cell as defined in claim 4, wherein the electrolyte comprises a solute selected from a group comprising $LiPF_6$, $LiBF_4$, $LiAsF_6$, $LiCF_3SO_3$, $LiN(CF_3SO_3)_2$, $LiClO_4$, and combinations of the foregoing.

7. An electrochemical cell as defined in claim 5, wherein the electrolyte comprises a solvent selected from a group comprising propylene carbonate, ethylene carbonate, diethyl carbonate, ethyl methyl carbonate, dimethyl carbonate, and combinations of the foregoing.

8. An electrochemical cell as defined in claim 4, wherein the electrolyte comprises a solvent selected from a group comprising propylene carbonate, ethylene carbonate, diethyl carbonate, ethyl methyl carbonate, dimethyl carbonate, and combinations of the foregoing.

9. An electrochemical cell as defined in claim 1, wherein the first electrode is a cathode having a first metal substrate, said first metal substrate comprising aluminum.

10. An electrochemical cell as defined in claim 9, wherein said second electrode is an anode having a second metal substrate, said second metal substrate comprising copper.

11. An electrochemical cell as defined in claim 1, wherein the first electrode is a cathode that comprises a metal substrate having the lithiated intercalation compound affixed to a surface thereof, wherein the second electrode is an anode that comprises a second metal substrate having affixed to a surface thereof the carbon mixed with molybdenum carbide material thereon, and wherein said respective surfaces of the cathode and anode are separated from one another by a micro-porous electrically non-conductive separator that is permeated by said aprotic, non-aqueous electrolyte which is in effective contact with said respective surfaces of the anode and cathode.

12. An electrochemical cell as defined in claim 11, wherein the metal substrate of the cathode comprises aluminum and the metal substrate of the anode comprises copper.

13. An electrochemical cell as defined in claim 11, wherein the separator comprises a micro-porous poly-olefin film.

14. An electrochemical cell as defined in claim 11, wherein the cathode and anode and their respective substrates and the electrolyte permeated separator are all contained within a sealed enclosure and wherein means including the respective substrates of the cathode and anode are provided for connecting said cell to an external electric unit.

15. A battery comprising a plurality of electrochemical cells as defined in claim 1, having their respective electrodes connected in an electric circuit defining a battery of said cells.

16. A battery comprising a plurality of electrochemical cells as defined in claim 11, having their respective electrodes connected in an electric circuit defining a battery of said cells.

17. A battery comprising a plurality of electrochemical cells as defined in claim 13, having their respective electrodes connected in an electric circuit defining a battery of said cells.

* * * * *

UNITED STATES PATENT AND TRADEMARK OFFICE
CERTIFICATE OF CORRECTION

PATENT NO. : 6,740,453 B2  
APPLICATION NO. : 10/084529  
DATED : May 25, 2004  
INVENTOR(S) : Hossain et al.

It is certified that error appears in the above-identified patent and that said Letters Patent is hereby corrected as shown below:

Claim 1, Column 7, Line 17, Please delete "molycarbide" and insert therefor --molybdenum carbide--

Claim 4, Column 7, Line 28, Please delete "taken from a group comprising" and insert therefor --selected from the group consisting of--

Claim 6, Column 7, Line 37, Please delete "comprising" and insert therefor --consisting of--

Claim 7, Column 7, Line 41, Please delete "comprising" and insert therefor --consisting of--

Claim 8, Column 7, Line 46, Please delete "comprising" and insert therefor --consisting of--

Signed and Sealed this

Thirtieth Day of December, 2008

JON W. DUDAS  
*Director of the United States Patent and Trademark Office*